Jan. 8, 1963

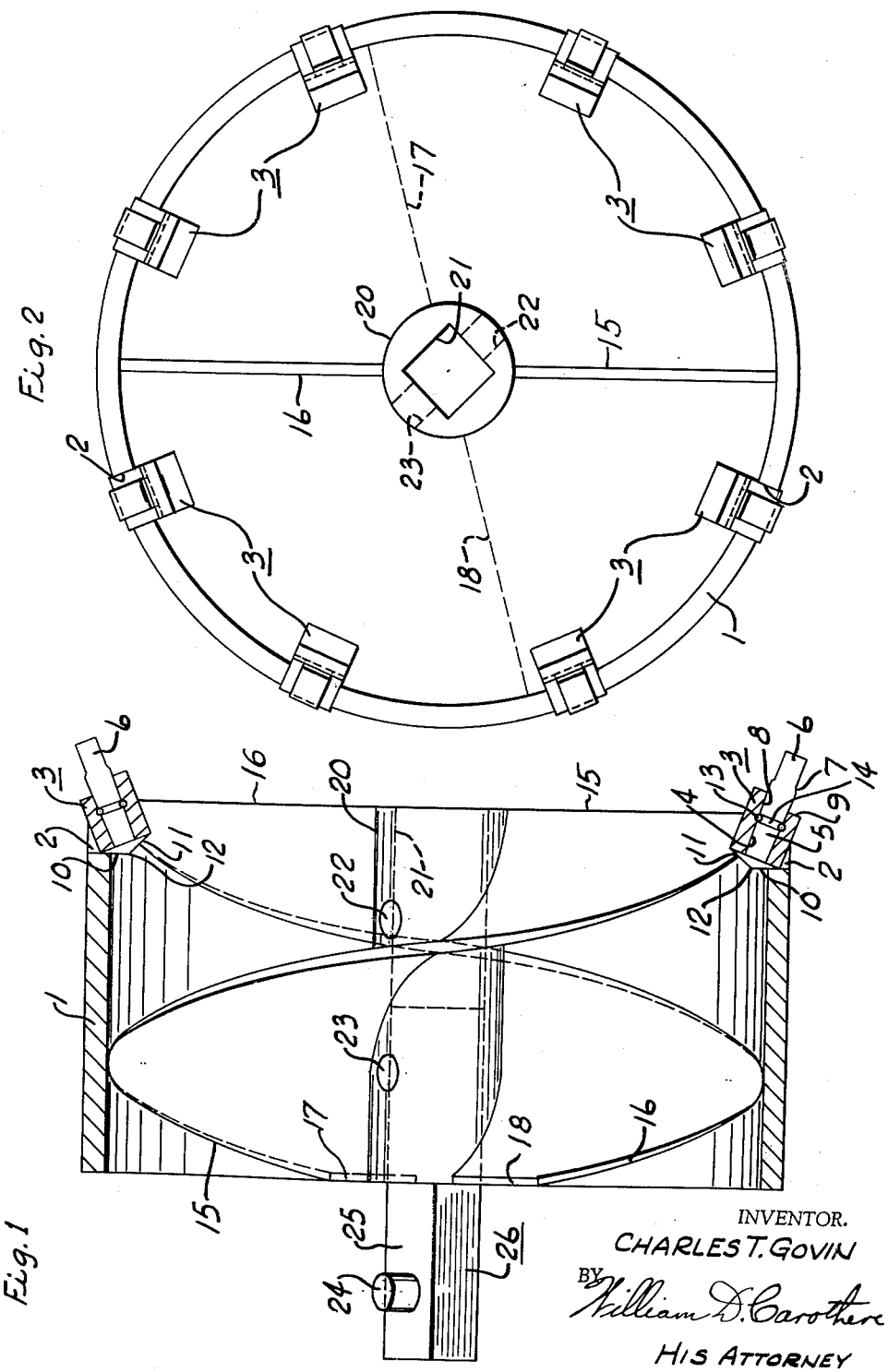

C. T. GOVIN 3,072,205

AUGER REAMING HEAD

Filed Feb. 26, 1960

INVENTOR.
CHARLES T. GOVIN
BY
HIS ATTORNEY

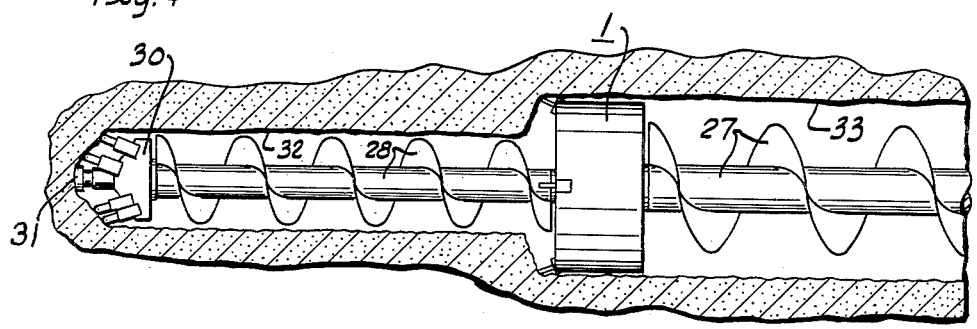
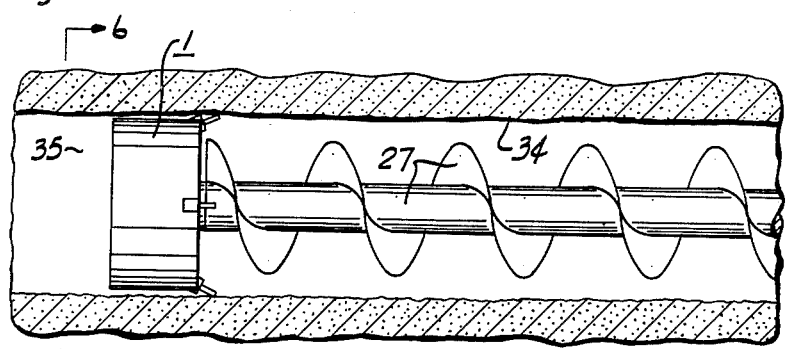
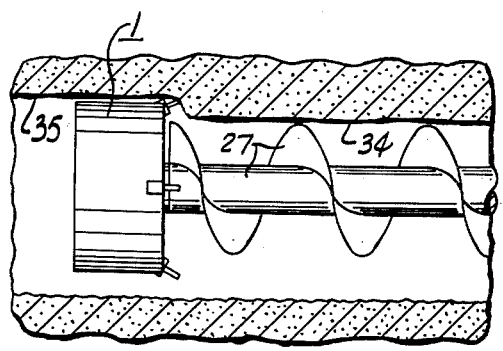
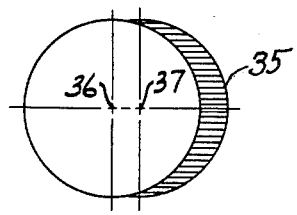

United States Patent Office 3,072,205
Patented Jan. 8, 1963

3,072,205
AUGER REAMING HEAD
Charles T. Govin, Salem, Ohio, assignor to The Salem Tool Company, Salem, Ohio, a corporation of Ohio
Filed Feb. 26, 1960, Ser. No. 11,296
4 Claims. (Cl. 175—386)

This invention relates generally to reaming heads and more particularly to reaming heads for augers for enlarging and straightening augered holes drilled under roads and the like. When augering a hole for the cutting head on the end of the auger, the auger has a tendency to drift to the right when rotated clockwise. If the auger is of the opposite hand and rotated counter-clockwise to auger the hole the auger has a tendency to drift to the left. This presents a problem because one is not permitted too much leeway in drilling holes under roads, streams and the like for the insertion of pipe. Then too one may drill and auger a smaller hole to determine the character of material through which the auger has to drill before cutting or reaming a larger hole. Thus there are many reasons for wishing to first auger the hole and then enlarge the same by the use of a reaming head. Thus the reaming head must be constructed to provide the answer to each of these problems.

One of the principal objects of this invention is the provision of a reaming head that may be employed to enlarge the hole as the auger advances into the ground as well as to enlarge the hole after it has been drilled by inserting the reaming head on the end of the auger and retracting it through the drilled hole.

Another object is the provision of a reaming head that has one set of cutting bits on each end thereof to permit it to be used when advancing an auger string into the hole and when being retracted through a drilled hole following the auger string.

Another object is the provision of a reaming head that may be employed intermediate an auger string when advancing into the earth and at the end of the auger string when being retracted through a previously augered hole to make the same larger.

Another object is the provision of an improved auger head having a socket hub for the purpose of receiving a pin from either end to enable the reaming head to be placed intermediate an auger flight or at the end of an auger flight or as a portion of the cutting head and being provided with a pilot bit.

Other objects and advantages appear hereinafter in the following description and claims.

The accompanying drawings show for the purpose of exemplification without limiting this invention or the claims thereto, certain practical embodiments illustrating the principles of this invention wherein:

FIG. 1 is a view in side elevation with parts in section of the reaming head comprising this invention.

FIG. 2 is an end view of FIG. 1.

FIG. 4 is a view in side elevation of the reaming head intermediate auger sections of different diameters.

FIG. 5 is a view in side elevation showing a reaming head at the end of an auger being drawn back through the hole for correcting drift.

FIG. 6 is a sectional view taken along the line 6—6 of FIG. 5 to illustrate the difference in the centers of the auger and the reamer.

FIG. 8 is a sectional plan view of the structure shown in FIG. 5 illustrating the back reamer correcting the drift depicted in FIG. 6.

Figure 3:
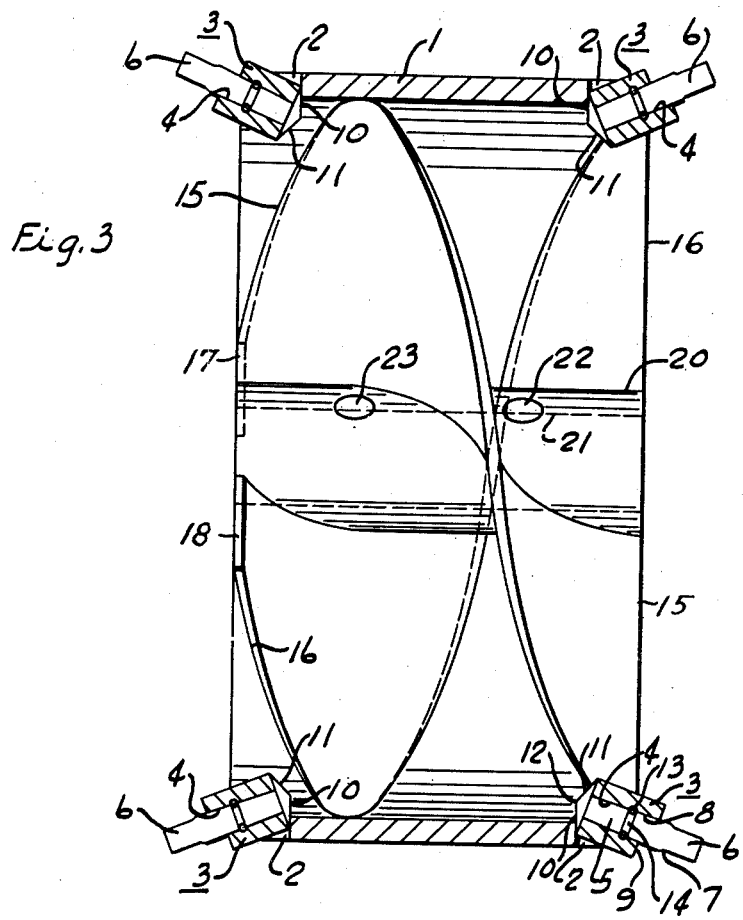
FIG. 3 is a sectional view of a reaming head having bits at opposite ends.
Figure 7:
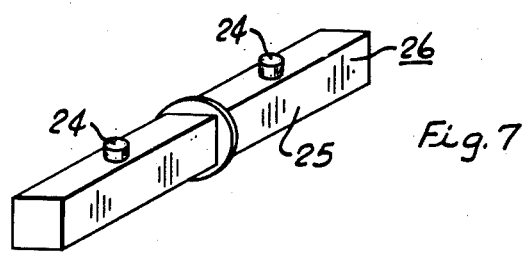
FIG. 7 is a perspective view of a shank that may be positioned in either end of the reaming head.

Referring to FIG. 1 of the drawings, the reaming head comprises the cylinder 1 which is provided with a series of slots 2 receiving the bit holders 3 that are provided with tapered sockets 4 as shown for receiving the complementary shaped shanks 5 of the bits 6. The bits 6 have a squared section 7 that fits the squared face 8 adjacent and extending outwardly from the radial surface 9. The tapered surfaces hold the bit snug and the mating square faces hold the bit from turning to lock the bit in the socket and provide improved surface area for the transmission of cutting forces through the bit into the socket.

The bottom of the bit holder 3 has two faces 10 and 11 which determine the seating of the holder against the gauging surface of the bottom of the slot 2. The square faces 7 and 8 orient the bit 6 in the socket 4 and the face 10 is seated on the bottom of the slot 2 to properly orient the bit holder 3 and thus the bit 6 for cutting the outer clearance. The face 11 when abutted against the bottom of the slot 2 is used to orient the bit to cut the inner clearance and when the bit is set so as to extend straight out from the end of the cylinder 1 the apex 12 of the bit holder 3 is bottomed on the slot 2. Thus with the apex 12 and the faces 10 and 11 there is no difficulty in properly aligning the positions of the sockets and attaching them to the end of the cylinder 1.

As shown in FIG. 2 the cylinder 1 is provided with eight slots 2, each of which is to be provided with a bit holder 3 as illustrated in FIG. 1.

The bit holder 3 is provided with a transverse hole 13 that transverses the socket 4 to receive an open slotted collar that is substantially cylindrical in form and when driven into the hole passes through the groove 14 in the bit shank 5 to lock the bit 6 from coming out of the socket.

The bit holder 3 with its socket 4 and gauging faces 10 and 11 and gauging apex 12 form the principal part of copending application Serial No. 10,773 entitled "Lump Producing Head for Coal Augering" filed February 24, 1960.

The cylindrical head 1 is provided with two helical flights 15 and 16 which are disposed 180° from each other and extend through approximately 270°, the trailing edge of the flight 15 being indicated at dotted lines 17 and the trailing edge of the flight 16 being indicated at lines 18 and when viewed from FIG. 2 the flights proceed in a clockwise direction to their respective trailing edges 17 and 18.

The inner or central edges of the flights 15 and 16 are welded to the surface of the hub member 20 which has a square hole 21 passing therethrough and is provided with aligned spaced locking pin holes 22 and 23 that pass diametrically through the hub section and are free of the flight sections. The hub members are free of the flight sections so as to receive the locking pins 24 of the alternate shank 25 of an adjacent auger section for the shank 25 of the pin member 26 which would function as a shank on either end depending upon what is necessary in the manner in which the reamer is employed.

If the reamer is employed as shown in FIG. 4 and the auger section 27 has a pin on its outer end this pin would be inserted in the hub socket 20 and a second pin such as illustrated at 26 would be placed in the opposite end to connect the reaming head 1 with the auger flight 28, which is smaller in diameter and has on its outer end a cutting head 30. If the augers have their socket members extending outwardly then the pin 26 would interconnect the reaming head 1 and the auger flight 27 and the pin of the auger flight section 28 would interconnect this section with the reaming head 1. This would leave the cutter head 30 with a pin section or require the use of a shank in the form of the pin 26.

Referring to FIG. 3, the cylindrical head 1 is provided with the bit holders 3 for holding the bits 6 at both ends of the cylinder 1. This permits this head to be used in either direction and the bit holders 3 are mounted in the same manner as that previously described.

As shown in FIG. 4 a small pilot bit 31 and the cutter head 30 is employed to drill the hole and advance the reaming head 1. This hole is indicated at 32 whereas the reaming head 1 cuts the hole 33.

Both of the auger flights 27 and 28 are right-hand flights and operate clockwise from their motor end and they are arranged to drill the auger holes 32 and 33 as it initially proceeds through the ground. However in the structure shown in FIG. 5 the augered hole 34 was drilled all the way through or let us say to the very seat of the roadbed and then the reamer head 1 was joined on the end of the auger flight to cut the hole 35 as the auger is continued to be operated in a clockwise direction and the auger flights drag the reamer head 1 back under the roadbed to cut the bore 35.

Let it be assumed that the auger section 27 in FIGS. 5 and 8 was employed to cut the hole 34 as it was moved to the left and it had a proper cutting head such as illustrated at 30 to make this hole. As shown in FIG. 6 the center of this hole would be indicated at 36 which would be let us say to the left of the straight bore measured from the center 37 and in order to straighten this bore the back reamer at 1 was employed to cut along the axis 37 as shown in FIGS. 6 and 8 for the purpose of correcting the drift created by the original augering. The shaded area on the right in FIG. 6 indicates the correction made by the reamer head 1 to cut the bore 35.

Under some conditions when the auger is set in two sections of different diameter such as shown in FIG. 4 and is provided with a reaming head the device will still drift to the right. However if the auger reaming head such as illustrated in FIG. 3 is employed in drilling the hole 33 this would permit the head to pass completely beyond the roadbed and be free and then while rotating it clockwise the auger string in the reaming head 1 would be retracted so that the reaming head 1 actually corrects the hole that it drilled. Since this is a right-hand auger and is being rotated in a left-hand direction but at the same time is being drawn back toward the bore end of the auger string the drift would be in the opposite direction, and thus the reaming head would correct its own drift and to that extent drill a larger hole. The hole drilled would of course be merely enlarged and made nonround and not such as illustrated between the two holes 32 and 33 and 34 and 35. In any event the reamer as shown in FIG. 3 would provide a straight hole on its return travel and it would employ the bits at the opposite ends of the reaming head.

Again the reaming head with the bits at both ends will permit the structure to cut through rock and debris that caved in on a hole and thus provide a further improvement in the art of augering through a roadbed.

Frequently it is necessary to drill not only under roadbeds, whether they be highway or rail beds, but also under trees and sometime small hills, and in a good many instances as the hole is drilled a tubing is inserted through the hole, which tubing is preferably welded as a continuous member as it is fed into the hole, and it is quite important that the hole be straight in order that it might receive the tubing without transmitting force that would have a tendency to destroy the tubing. Thus by employing an auger drill to cut a small hole and then reaming the same material greater accuracy is obtained.

I claim:
1. A cutting head for connection with square driving members on opposite sides consisting of an annular body, a series of spaced bit holders around at least one end of said annular body, cutting bits mounted in said bit holders, a hub substantially as long as said annular body coaxially concentric with and supported in said annular body, said hub having a square driving bore therethrough, conveyor flights of predetermined hand connecting said hub with the interior of said annular body to support the latter, said hub having spaced locking pinholes radial to said square driving bore and adjacent each end of said hub to connect said square driving bore to square driving members for facing the bits in said head in either direction.

2. The cutting head of claim 1 characterized by a pilot bit, a square driving member connected to said pilot bit to fit said square driving bore for progressively cutting a hole with said annular body that is larger than said pilot bit, and a locking pin on said square driving pilot member cooperating with a locking pinhole in said hub to secure said pilot to said hub.

3. The cutting head of claim 1 characterized by an auger section having a square driving member extending therefrom and entering said square bore in said hub, and a locking pin on the square driving member cooperating with a locking pinhole in said hub to connect said auger section with said hub, the conveyor flight of said auger section and the conveyor flight of said annular body being of the same hand for removing mine material from the hole being drilled by backreaming.

4. The cutting head of claim 1 characterized by an auger section having a square member extending therefrom and entering said square bore in said hub, a locking pin on said square auger shank cooperating with one locking pinhole in said hub to connect said auger section with said hub, a second auger section having a square shank extending therefrom and entering the other side of said square bore in said hub, a locking pin on said second auger shank cooperating with the other locking pinhole in said hub to connect said second auger section with said hub, a pilot bit, a square driving shank on said pilot bit to connect with one of said auger sections, said annular body having cutting bits on both ends to cut in either direction and being larger in diameter than said pilot bit and auger sections.

References Cited in the file of this patent

UNITED STATES PATENTS

| | | |
|---|---|---|
| Re. 24,503 | Compton | July 15, 1958 |
| 2,675,213 | Poole et al. | Apr. 13, 1954 |
| 2,741,462 | Baca | Apr. 10, 1956 |
| 2,770,449 | McCarthy | Nov. 13, 1956 |
| 2,839,271 | Kandle | June 17, 1958 |